United States Patent [19]

Kurauchi et al.

[11] Patent Number: 5,254,190
[45] Date of Patent: * Oct. 19, 1993

[54] TENDONS FOR PRESTRESSED CONCRETE STRUCTURES AND METHOD OF USING SUCH TENDONS

[75] Inventors: Makoto Kurauchi, Houston, Tex.; Kiyoshi Hayasaki, Amagasaki, Japan; Toshikazu Minami, Amagasaki, Japan; Mutsuhiko Ohnishi, Amagasaki, Japan

[73] Assignee: Shinko Kosen Kogyo Kabushiki Kaisha, Amagasaki, Japan

[*] Notice: The portion of the term of this patent subsequent to Sep. 22, 2009 has been disclaimed.

[21] Appl. No.: 705,062

[22] Filed: May 23, 1991

Related U.S. Application Data

[60] Division of Ser. No. 478,704, Feb. 8, 1990, abandoned, which is a continuation-in-part of Ser. No. 111,197, Oct. 22, 1987, abandoned.

[30] Foreign Application Priority Data

Dec. 28, 1986 [JP] Japan .................. 61-309965

[51] Int. Cl.$^5$ .................. B29C 47/02; B32B 31/16
[52] U.S. Cl. .................. 156/85; 156/244.16; 156/244.13; 156/244.24; 156/86; 52/230; 52/732; 264/229
[58] Field of Search .................. 156/244.12, 244.13, 156/244.15, 244.23, 244.24; 425/71, 112, 113; 264/566, 173, 174, 568; 52/230, 732

[56] References Cited

U.S. PATENT DOCUMENTS

| | | |
|---|---|---|
| 2,702,424 | 2/1955 | Bakker . |
| 3,060,640 | 10/1962 | Harris . |
| 3,240,736 | 3/1966 | Beckwith . |
| 3,468,090 | 9/1969 | L'Hermite . |
| 3,579,931 | 5/1971 | Lang . |
| 3,640,776 | 2/1972 | Haney . |
| 3,646,748 | 7/1972 | Lang . |
| 3,869,530 | 3/1975 | Williams . |
| 3,899,384 | 8/1975 | Kelly . |
| 3,922,437 | 11/1975 | Kitta at al. . |
| 4,094,117 | 6/1978 | Torti et al. . |
| 4,185,440 | 1/1980 | Finsterwalder . |
| 4,237,186 | 12/1980 | Ingraham . |
| 4,250,226 | 2/1981 | Graham et al. . |
| 4,290,841 | 4/1981 | Fukuhara . |
| 4,442,646 | 4/1984 | Prevedini . |
| 4,577,443 | 3/1986 | Kitta et al. . |
| 4,631,883 | 12/1986 | Harris et al. . |
| 4,635,433 | 1/1987 | Takei et al. . |
| 4,643,929 | 2/1987 | Watanabe et al. . |
| 4,661,387 | 4/1987 | Watanabe et al. . |
| 4,726,163 | 2/1988 | Jacobs . |
| 4,761,336 | 8/1988 | Hart . |
| 4,776,161 | 10/1988 | Sato et al. . |
| 4,929,650 | 5/1990 | Kurauchi et al. . |

FOREIGN PATENT DOCUMENTS

| | | |
|---|---|---|
| 49652 | 12/1959 | Australia . |
| 28410 | 5/1984 | Australia . |
| 201280 | 12/1958 | Austria . |
| 0129976 | 1/1985 | European Pat. Off. . |
| 0219894 | 4/1987 | European Pat. Off. . |
| 0273564 | 7/1988 | European Pat. Off. . |
| 1609722 | 6/1971 | Fed. Rep. of Germany . |

*Primary Examiner*—Caleb Weston
*Attorney, Agent, or Firm*—Oblon, Spivak, McClelland, Maier & Neustadt

[57] ABSTRACT

A tendon for prestressed concrete structure comprises a core member such as a steel wire for prestressed concrete structures, a steel strand for prestressed concrete structures or a steel bar for prestressed concrete structures, and an unset bonding material coating the core structure in a predetermined thickness, having a specific setting time determined by selectively determining the respective contents of the ingredient of the bonding material and capable of setting at an ordinary temperature. The tendon is arranged in a desired arrangement for forming a prestressed concrete structure, concrete is placed so as to bury the tendons therein, and then the tendons are tensioned and fixed after the strength of the deposited concrete has increased to a degree to permit tensioning the tendons and before the unset bonding material sets. Thus, the unset bonding material sets after the tendons have been tensioned and fixed to bond the tendons firmly to the prestressed concrete structure.

1 Claim, 7 Drawing Sheets

TENDONS FOR PRESTRESSED CONCRETE STRUCTURES AND METHOD OF USING SUCH TENDONS

This is a divisional application of U.S. application Ser. No. 07/478,704 filed Feb. 8, 1990, now pending, which is a file wrapper continuation-in-part of U.S. application Ser. No. 07/111,197, filed Oct. 22, 1987, now abandoned.

BACKGROUND OF THE INVENTION

1. Field of the Invention

The present invention relates to tendons for posttensioned prestressed concrete structures, which can be completely protected from corrosion without requiring grouting, can integrally be incorporated into prestressed concrete structures after being tensioned, and can easily be used for prestressing concrete structures, and also relates to a method of using such tendons.

2. Description of the Prior Art

In the conventional posttensioning process for forming a prestressed concrete structure, sheaths are arranged prior to the placement of concrete, prestressing steel members such as steel bars, wires or strands are inserted in the sheaths after or before the concrete has set, and then the prestressing steel members are tensioned when the concrete has the desired strength. Then, a cement slurry or the like is injected under pressure into the sheaths for corrosion prevention and for integrally bonding the prestressing steel members to the concrete structure. The insertion of the prestressing steel members into the sheaths and the injection of the cement slurry or the like require very complicated work requiring a long time and much labor and increasing the cost of prestressed concrete structures. Furthermore, since, in most cases, the prestressing tendon is arranged in curvature, it is difficult to fill up the sheaths perfectly with the cement slurry or the like, and hence it is possible that the prestressing steel members in unfilled portions of the sheaths are corroded.

A method of eliminating such disadvantages of the conventional posttensioning process is proposed, for example, in Japanese Patent Publication No. 53-47609 corresponding to U.S. Pat. No. 3,646,748, in which a prestressing member is formed by coating a steel material with a grease and encasing the steel material coated with the grease in a plastic case. This method completely prevents corrosion of the prestressing steel by grease or the like and makes injection of a cement slurry or the like unnecessary. However, the prestressing steel remains not bonded to the concrete structure after the same has been tensioned. Accordingly, when the prestressing tendon is overloaded temporarily, a load is concentrated on the fixed portions of the prestressing tendon to break the prestressing steel at the fixed portions Since the prestressing steel is not bonded to the concrete structure, breakage of the prestressing steel, even at a single point thereon, affects the strength of the prestressed concrete structure entirely. Furthermore, the ultimate bending strength of a prestressed concrete structure having an unbonded prestressing tendon is lower than that of an equivalent prestressed concrete structure having a bonded prestressing tendon.

Austrian Patent No. 201,280 and EP 219,284 propose structure of this general type but which do not teach or disclose a sheath. EP 129,976 shows corrugated sheaths in the drawings, but they are not seamless, and thus lack anti-corrosion characteristics. U.S. Pat. No. 4,726,163 to Jacob shows an insulating material 9 in its drawings but this lacks a detailed explanation in the specification. U.S. Pat. No. 3,646,748 to Lang teaches a method of manufacturing a seamless sheath with a long span but does not teach a method of manufacturing a corrugated sheath. Therefore, the prior art is still characterized by difficulty in manufacturing a tendon with a corrugated sheath that is seamless and which has a long span.

SUMMARY OF THE INVENTION

The present invention has been made to eliminate the drawbacks of the conventional prestressing tendon.

Accordingly, it is an object of the present invention to provide tendons for prestressed concrete structures, comprising a core member, capable of perfectly preventing the corrosion of the core member, capable of firmly adhering to concrete and not having a weakness at the fixed portions thereof.

It is another object of the present invention to provide a method of using such tendons.

According to a first aspect of the present invention, the tendon comprises a core member for prestressing a concrete structure, such as a steel wire, a steel strand or a steel bar, and the core member for prestressing a concrete structure is coated with a substantially uniform film of $20\mu$ or above in thickness of an unset bonding material having a setting time adjusted so that the unset bonding material does not set before the core member is tensioned and sets at an ordinary temperature after the core member has been tensioned and the tendon has been fixed to the concrete structure.

According to a second aspect of the present invention, the tendon comprises a core member for prestressing a concrete structure, such as a steel wire, a steel strand or a steel bar, the core member for prestressing a concrete structure is coated with a film of $20\mu$ or above in thickness of an unset bonding material having a setting time adjusted so that the unset bonding material does not set before the core structure is tensioned and sets at an ordinary temperature after the core structure ha been tensioned and the tendon has been fixed to the concrete structure, and the core member coated with such an unset bonding material is encased in a sheath to facilitate handling.

According to a third aspect of the present invention, the tendon comprises a core member for prestressing a concrete structure, such as a steel wire, a steel strand or a steel bar, the core structure is coated with an unset bonding material, and the adhesion of the core structure is increased after the bonding material has set.

According to a fourth aspect of the present invention, the tendons each comprise a core member for prestressing a concrete structure, such as a steel wire, a steel strand or a steel bar, coated with a film of $20\mu$ or above in thickness of an unset bonding material having a setting time adjusted so that the unset bonding material does not set before the core member is tensioned and sets at an ordinary temperature after the core member has been tensioned and the tendon has been fixed to the concrete structure are arranged in a predetermined arrangement, concrete is placed, and then the core members are tensioned before the bonding material sets, after the strength of the deposited concrete has increased to a predetermined degree.

According to a fifth aspect of the present invention, the tendons each comprise a core member for prestressing a concrete structure, such as a steel wire, a steel strand or a steel rod, coated with a film of 20μ or above in thickness of an unset bonding material having a setting time adjusted so that the bonding material does not set before the core structure is tensioned and sets at an ordinary temperature after the core structure has been tensioned and the tendon has been fixed to the concrete structure, and encased in a sheath are arranged in a predetermined arrangement in a mold, concrete is placed, and then the core member is tensioned before the bonding material sets, after the strength of the concrete has increased to a predetermined degree.

Thus, according to the present invention, the setting time of the unset bonding material coating the core member is adjusted so that the bonding material will not set before the tendon is tensioned and will set at an ordinary temperature after the tendon has been tensioned and fixed to the concrete structure, because the uniform propagation of a tensile force applied to the tendon through the entire length of the tendon is obstructed by adhesion of the tendon to the concrete structure if the bonding material sets before the application of a tensile force to the tendon.

Generally, it takes approximately 170 hours after placement for the strength of concrete containing General-Use Cement to increase to a degree to permit tensioning tendons, and approximately 70 hours after placement for the strength of concrete containing High-Early-Strength Cement to increase to such a degree. Accordingly, a bonding material having a setting time adjustable to 70 hours or longer is used preferably for coating the core member and, more preferably, a bonding material having a setting time adjustable to 170 hours or longer is used for coating the core member. This is referred to as a latent normal temperature settable adhesive, meaning a latent settable and normal temperature settable adhesive as described above. A latent adhesive preferably has a setting time adjustable to 70 hours or more, and more preferably, 170 or longer. A normal temperature settable adhesive means that it sets at a normal temperature without being heating before setting. Since it is desirable that the bonding material coating the core member sets quickly after the core structure has been tensioned, it is preferable that the setting time is one year or less.

When the thickness of the film of the unset bonding material coating the core member is less than 20μ, it is possible that pin holes are developed in the film to deteriorate the corrosion preventing effect of the film, and the film is unable to separate the core member satisfactorily from the concrete structure, so that the frictional resistance of the concrete member to movement of the core member during tensioning operation is increased. When the core member is a steel strand for prestressed concrete structure, the core surface of the core member cannot be coated by the bonding material so as to have a uniform thickness. In such case, the core structure is coated with the bonding material so that the thickness of the thinnest portion of the film is 20μ or above.

There is no particular restriction on the method of application of the bonding material provided that the core structure is coated with the bonding material in an appropriate thickness; the bonding material may be applied through any suitable coating process, for example, a brush coating process or a dip coating process.

Thus, an unset bonding material prepared so that it will not set before the core member is tensioned is applied to the core members of the tendons, the tendons are arranged in a desired arrangement, concrete is placed, and then the core members are tensioned after the strength of the concrete has reached a degree to permit tensioning the core members. Accordingly, the bonding material does not set before the core members are tensioned and hence the core members are not bonded to the concrete structure before the core members are tensioned, so that the core members can be tensioned uniformly over the entire length. After the core members have been tensioned, the bonding material sets gradually to bond the core members firmly to the concrete structure.

Thus, the present invention provides the following excellent effects.

(A) The core structures are coated with the bonding material at the place of manufacture, and hence the work necessary for arranging sheaths, inserting the core members into the sheaths and injecting a cement slurry into the sheaths, which has been performed in the conventional posttensioning process, is not necessary, so that labor necessary for forming a prestressed concrete structure and the cost of the prestressed concrete structure are reduced remarkably.

(B) The bonding material coating the core members sets gradually by chemical reaction without requiring any artificial process such as heating, so that neither labor nor an apparatus is necessary for setting the bonding material and no dangerous work is required for forming a prestressed concrete structure.

(C) The core members are coated perfectly with the bonding material and the bonding material sets after the core members have been tensioned, so that the core members are completely prevented from corrosion.

(D) The bonding material sets to bond the core members firmly to the concrete structure, which improves the drawbacks of the unbonded core members incorporated into the concrete structure.

(E) The core members coated with the bonding material can be encased in sheaths, respectively, at the place of manufacture, so that the tendons can be manufactured under sufficient quality control and the corrosion of the core members attributable to the use of an inappropriate grout is positively prevented.

There has not previously existed a tendon with a sheath that has corrugated outer and inner surfaces which is seamless and has a long span due to the fact that it was technically impossible to manufacture a tendon of this type. In the prior art, a tendon with a corrugated sheath would necessarily be of shorter length, that is, less than 20–30 m, and would be fabricated by inserting the core member into the prefabricated ready-made corrugated sheath or winding the tape spirally on the core member.

As recognized in accordance with the present invention, if it becomes possible to manufacture a relatively long span tendon, this would be advantageous in the posttensioning concrete industry. This is because it is desirable to supply a tendon with a length exceeding 20–30 m due to an increase in larger-scale buildings, bridges, highways, etc. and also due to a strong demand for these products.

BRIEF DESCRIPTION OF THE DRAWINGS

The above and other objects, features and advantages of the present invention will become apparent from the following description taken in conjunction with the accompanying drawings, in which:

FIGS. 8a-c and 9 illustrate details of the forming dies and vacuum chamber using the method of FIG. 7 wherein FIG. 8c is a view taken along line A—A in FIG. 8b;

DESCRIPTION OF THE PREFERRED EMBODIMENTS

Embodiment 1

Figure 1:
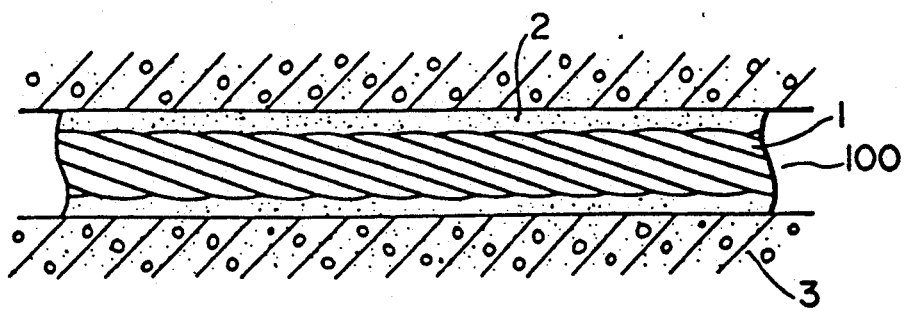
FIG. 1 is a fragmentary longitudinal sectional view of a tendon, in a preferred embodiment, according to the present invention.

Referring to FIG. 1, a tendon 100, in a first embodiment, according to the present invention comprises a core member 1 and a bonding material 2 coating the core member 1 in a film of a thickness in the range of 0.5 to 1 mm. The core member 1 is a steel strand of 12.7 mm in diameter for prestressed concrete. The bonding material 2 is a mixture of an epoxy resin and 0.3 percent by weight of an amine hardener containing a setting accelerator, having a setting time of approximately six months. Although there is not any particular restriction on the type of the bonding material, preferably, the bonding material 2 is a bonding material containing, as a principal ingredient, an epoxy resin, a polyurethane resin or a polyester resin in the light of sufficient strength of adhesion to the steel core member 1 and the necessity of avoiding the corrosive action of the bonding material 2 on the steel core structure 1.

A plurality of the tendons 100 are arranged in a predetermined arrangement, and then concrete 3 is placed so as to bury the tendons.

Figure 3:
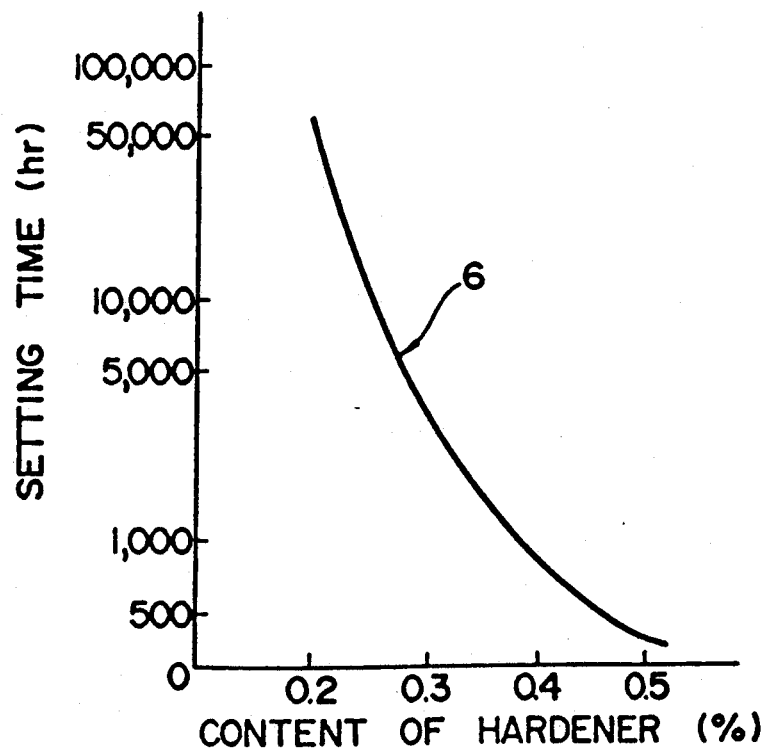
FIG. 3 is a graph showing the variation of setting time with the content of a hardener.

Referring to FIG. 3 showing the variation of the setting time of the bonding material 2 with the contents of the hardener, the setting time of the bonding material 2 can be adjusted to an optional time by selectively determining the content of the hardener.

The tendons 100 were arranged in a predetermined arrangement or pattern one month after the manufacture thereof and the concrete 3 was deposited. The tendons 100 thus placed in the concrete 3 were subjected to tensioning tests two months after the manufacture thereof, in which the rate of reduction of tensile force applied to one end of each tendon 100 during propagation to the other end of the tendon 100 was measured.

Figure 4:
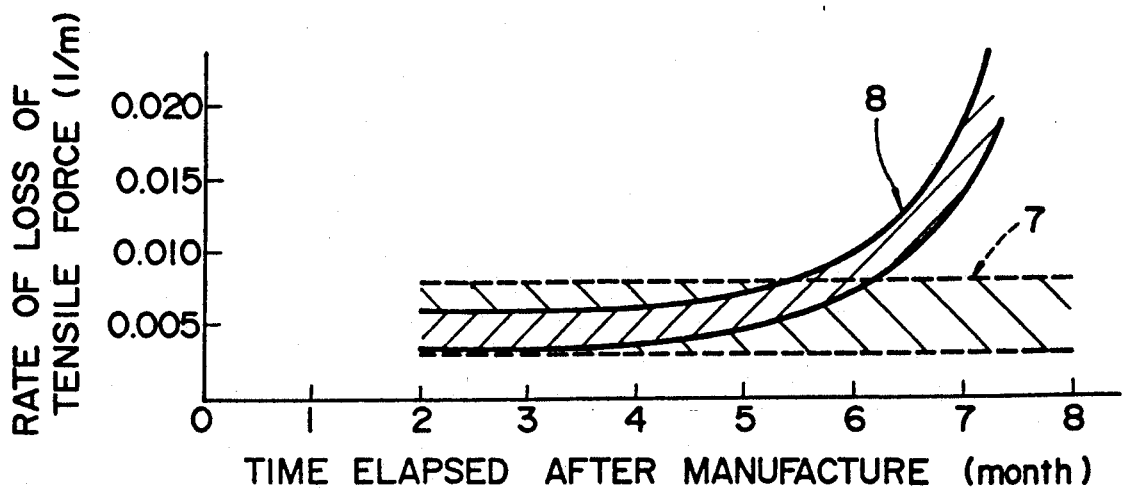
FIG. 4 is a graph showing the variation of the adhesive strength of the core members with the lapse of time after the tendons have been buried in concrete.

The results of the tensioning tests are shown in FIG. 4, in which an area 8 represents the variation of the rate of loss of tensile force as compared with the lapse of time with the tendons 100 of the present invention, and an area 7 represents the variation of the rate of loss of tensile force as compared with the lapse of time with conventional unbonded tendons each comprising a steel strand for prestressed concrete subjected to the tensioning tests as controls. As is obvious from FIG. 4, the rate of loss of tensile force applied to one end of the tendon 100 of the present invention remains at a low level, substantially the same as that of the conventional unbonded tendon within six months after the manufacture. The rate of loss with the tendons 100 starts increasing from a period of time six months after manufacture, which infers that the core members 1 of the tendons 100 are bonded firmly to the concrete 3 six months after manufacture. Thus, the tendon 100 of the present invention can be tensioned satisfactorily within six months after the manufacture.

Although the setting time of the bonding material 2 of the second embodiment is adjusted to six months, the setting time of the bonding material 2 can be adjusted to an optional time by properly determining the contents of the ingredients thereof taking into consideration the time in which the strength of the content 3 increases to a value to permit tensioning the tendon.

The tendons 100 were subjected further to pullout tests, in which a pulling force was applied to the tendons 100 after the bonding material 2 had set and the slip of the tendons 100 relative to the concrete 3 was measured. Measured results are shown in FIG. 5, in which a curve 10 represents the relation between the pulling force applied to steel strands for prestressed concrete buried directly in concrete and the average slip of the steel strands relative to the concrete, and a curve 11 represents the relation between the pulling force applied to the tendons 100 coated with an unset bonding adhesive without covering by a sheath, curve 12 represent the relation between pulling force and the average slip for steel strands covered by a sheath of polyethylene with both inner and outer surfaces corrugated in accordance with the present invention, while curve 16 shows a similar relation where the steel strands are covered by a sheath of polyethylene with both inner and outer surfaces made flat and curve 17 shows the relation where the steel strands are covered by the sheath of polyethylene with the outer surface corrugated.

Figure 5:
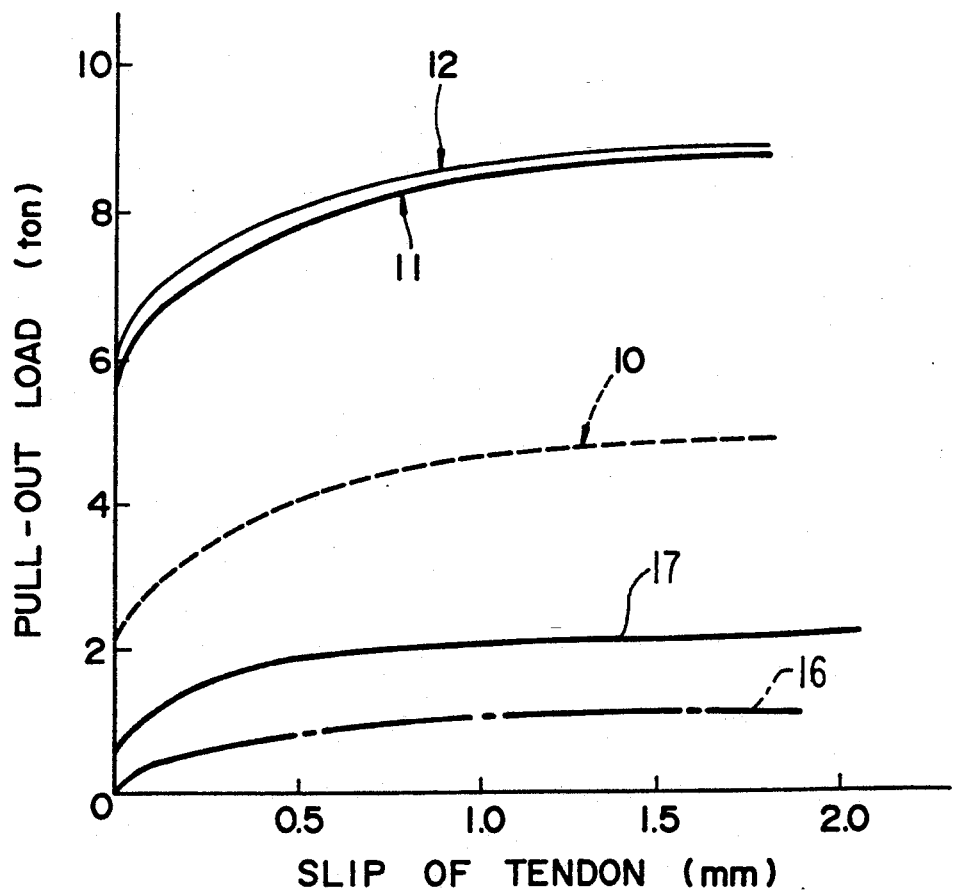
FIG. 5 is a graph showing the relation between pull-out load and the amount of slip of tendons relative to a concrete cylinder.
Figure 12A:
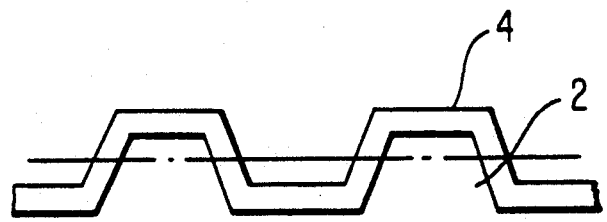
FIG. 12 shows different types of sheaths used in the method of FIG. 7.
Figure 12B:
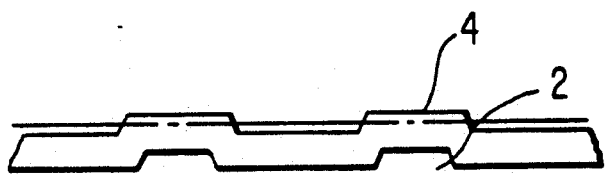

As is obvious from FIG. 5, the average maximum adhesive strength of 95.4 kg/cm$^2$, namely, a pulling force to which the adhesive strength of the tendon yielded, of the tendon 100 of the present invention is far greater than the average maximum adhesive strength of 46.6 kg/cm$^2$ of the control. It is also clear from FIG. 5 that the product manufactured by the present invention (i.e., line 12) is superior to other products. To gain the test result of line 12 of FIG. 5, it is very important that the depth of the indented portions of the plastic sheath exceeds the thickness of the plastic forming the sheath, as shown in FIG. 12a and to avoid having a depth which is too thin as shown in FIG. 12b.

Embodiment 2

Figure 2:
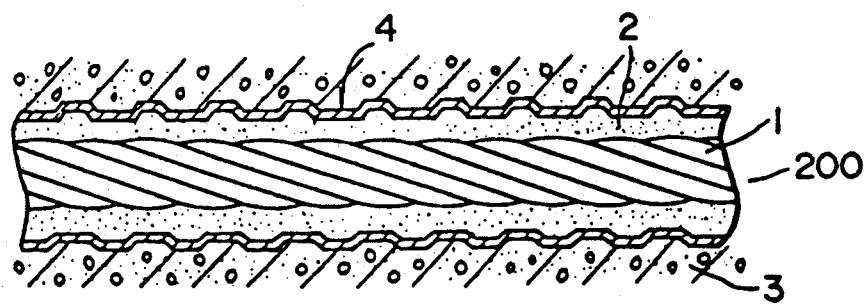
FIG. 2 is a fragmentary longitudinal sectional view of a tendon, in another embodiment, according to the present invention.

Referring to FIG. 2, showing a tendon 200, in a second embodiment, according to the present invention, the tendon 200 comprises a core member 1, which is similar to that of the first embodiment, a bonding material 2 coating the core member 1, and a corrugated sheath 4 encasing the core steel 1 coated with the bonding material 2 therein. A plurality of the tendons 200 are arranged in a predetermined arrangement, and then the concrete 3 is placed.

The bonding material 2 of the second embodiment is the same as that of the first embodiment. The setting time of the bonding material 2 is approximately six months.

The core member 1 is a steel strand of 12.7 mm in diameter for prestressed concrete. The core member 1 was dipped in the bonding material 2 to coat the core member 1 with the bonding material 2 to a thickness in the range of 0.5 to 1 mm.

Although the sheath 4 is formed of a polyethylene resin in this embodiment, the sheath 4 may be formed of any suitable resin or an ordinary metal such as a steel. The sheath 4 is corrugated to restrain the sheath 4 from axial movement relative to the concrete 3.

The tendons 200 were subjected to pull-out tests. The test procedures were the same as those taken for testing the adhesive strength of the tendons 100 of the first embodiment. The results of the pull-out tests are represented by a curve 12 in FIG. 5. The average maximum adhesive strength of the tendons 200 is 96.0 kg/cm$^2$, which is far greater than that of the conventional tendons.

Figure 6:
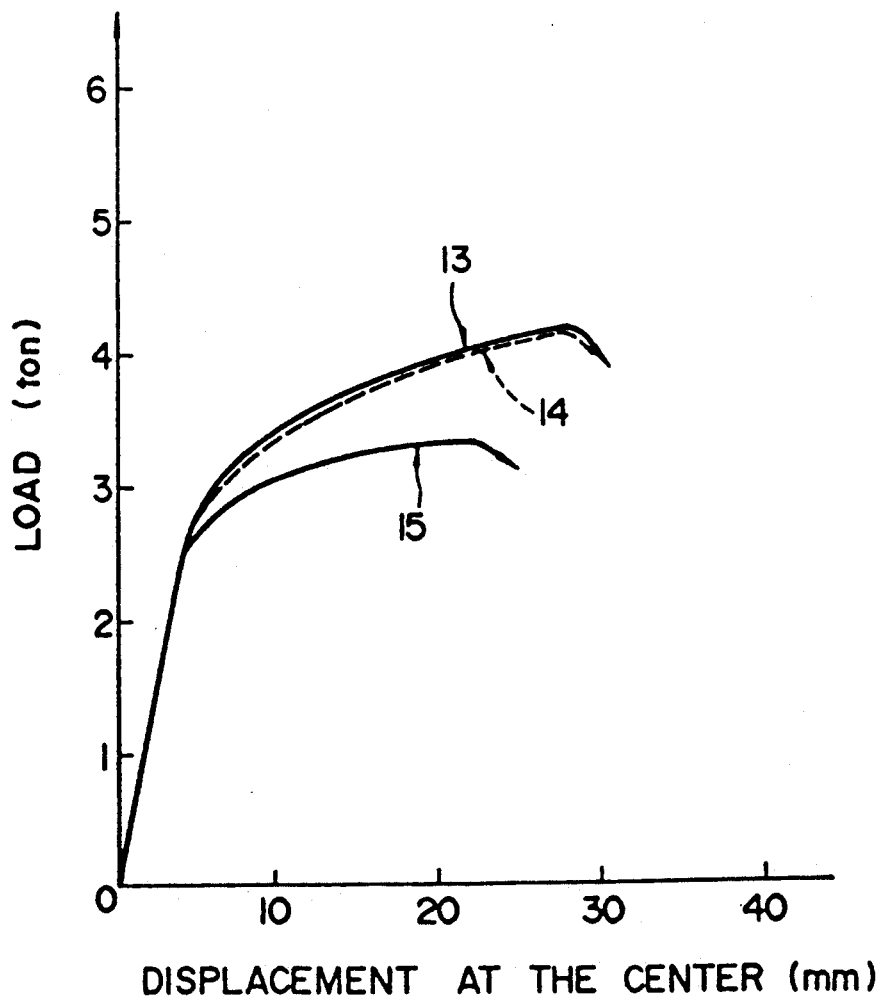
FIG. 6 is a graph showing the load-displacement curves of the concrete beams with both ends sustained.

The prestressed concrete test beams A incorporating the tendons 200, the prestressed concrete test beams B incorporating steel strands of 12.7 mm in diameter for prestressed concrete and fabricated through the ordinary pottensioning process and the cement grouting process, and the prestressed concrete test beams C incorporating unbonded steel strands for prestressed concrete were subjected to bending tests specified in JIS (Japanese Industrial Standards) A 1106. Test results are shown in FIG. 6, in which curves 13, 14 and 15 are load-displacement curves respectively for the prestressed concrete test beams A, B and C. As is obvious from FIG. 6, the prestressed concrete test beams A and B are substantially the same in bending strength and load-displacement characteristics, and the bending characteristics of the prestressed concrete test beam A are superior to those of the prestressed concrete test beams C.

To meet the requirement of supplying, for example, 202 tendons having a length of 70 m for constructing an office building, P. C. strands having a length of 1,510 m were manufactured by the method of this invention, and were wound on reels for storage. Then the P. C. strands were cut to a length of 70 m each after feeding them out from the reels, and anchorages were attached to the end of each strand. It took only 8 hours to finish this operation. Though this was completed at a factory, it was also possible to do it at the construction site.

By comparison, using the method of the prior art, it would take about 160 hours to finish this operation. This is because in the prior art the P. C. strands are cut to the predetermined length, the corrugated sheaths are prepared with a predetermined length, the P. C. strand is inserted into the sheath, the interstices are filled between the P. C. strand and the sheath is filled with an unset bonding adhesive and the anchorage is attached to the end of each P. C. strand. As mentioned below, insertion of P. C. strand into the sheath is very difficult when the length of P. C. strand exceeds 20-30 m.

The method of manufacturing the tendon with a corrugated sheath will now be described.

Figure 7:
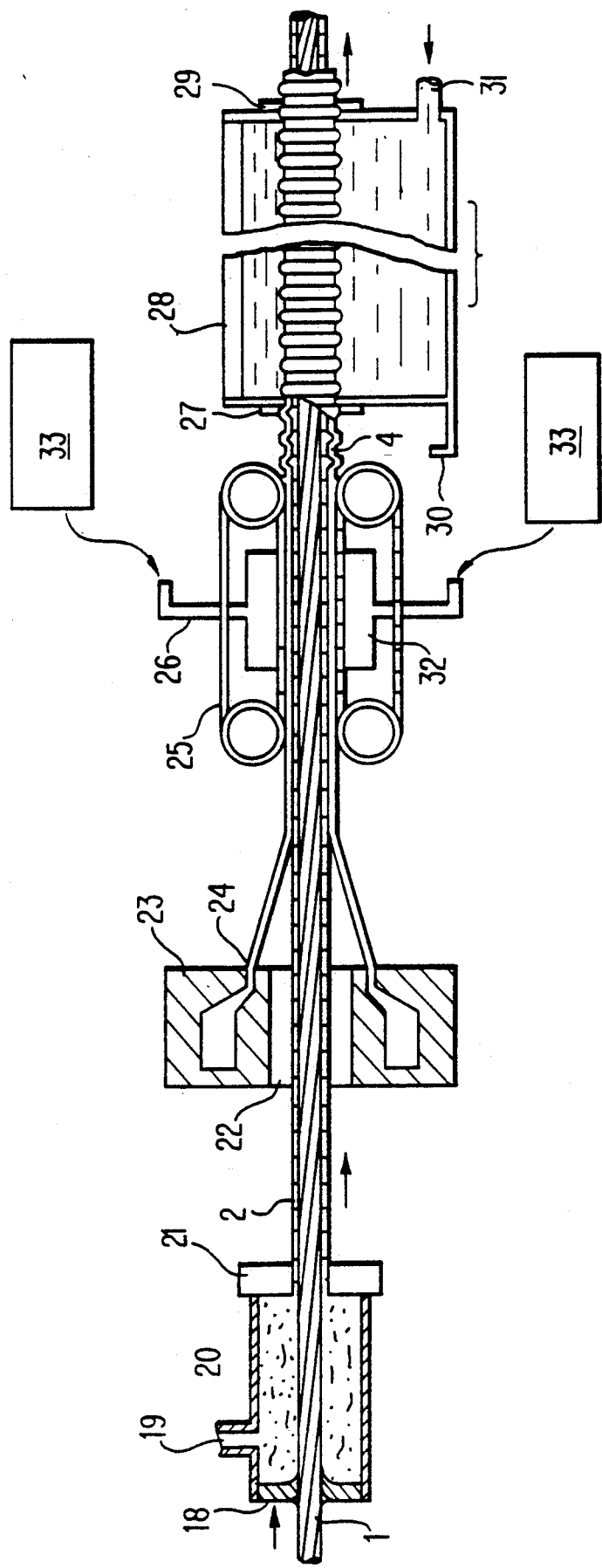
FIG. 7 illustrates the method of manufacturing the tendon with a corrugated sheath.

FIG. 7 illustrates the manufacturing process of the tendon in accordance with this invention. A wire strand core member 1 is passed into the pressure chamber 20 filled with an unset resin 2 and excess unset resin is removed by a circular die 21 at the outlet of the chamber 20.

Then, the core member 1 coated uniformly with the resin 2 passes through the throat 22 of the tubing die 23. A molten thermoplastic polymer 24 is extruded as a tube around the coated core member 1.

Figure 10:
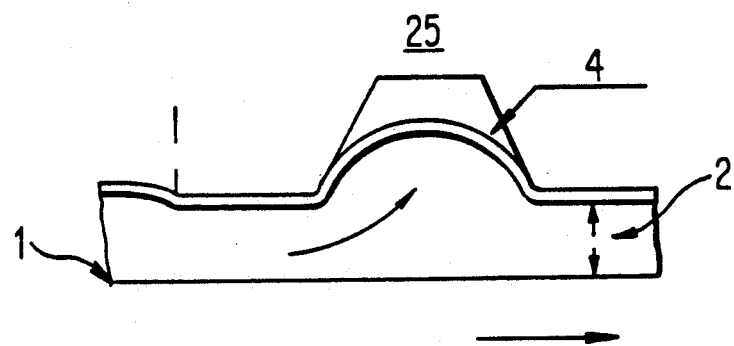
FIGS. 10 and 11 show the effect of the forming die on the sheath in the method of FIG. 7.

After completion of this process, the plastic polymer 24 shrinks and forms a seamless plastic sheath around said core member 1. While the extruded plastic polymer 24 is still hot, the tendon is passed between the forming dies 25 attached to a caterpillar or a pair of endless conveyors, and is pressed and deformed to some extent as shown in FIG. 10 which illustrates the inlet of the caterpillar and die 25. In this stage, because unset resin 2 exists in the inner side of the sheath 4, the inner surface of the plastic sheath is not deformed enough but protrudes slightly due to the pressure of pressed resin 2. Therefore, it is necessary to apply suction to the outer surface of the sheath 4 by the vacuum pump to form corrugated surfaces on both the inside and outside surface of the sheath 4. The extent of vacuum applied may be adjusted according to the strength and thickness of the sheath.

Figure 8A:
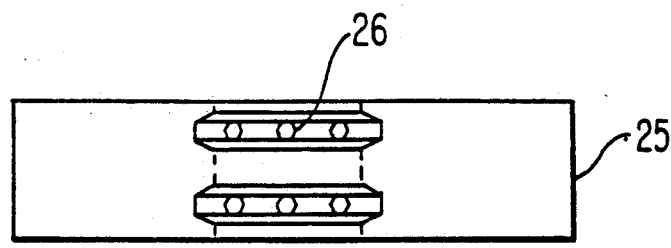
Figure 8B:
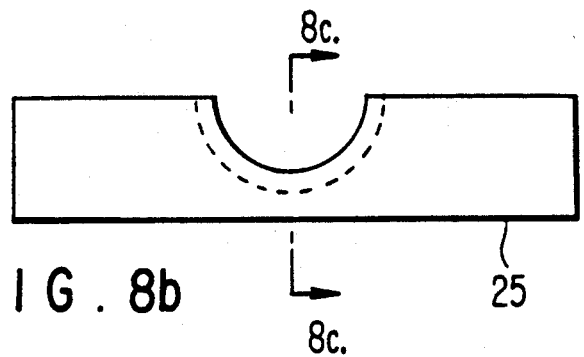
Figure 8C:
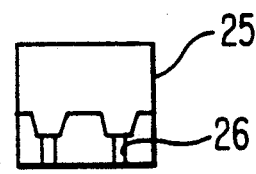
Figure 9:
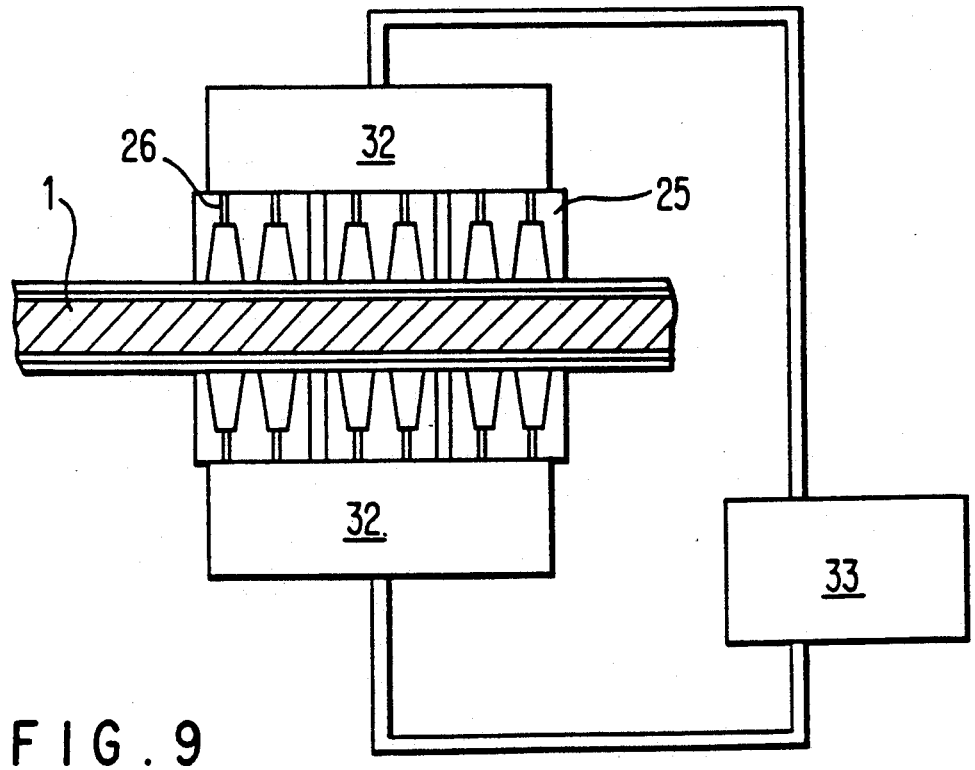
Figure 11:
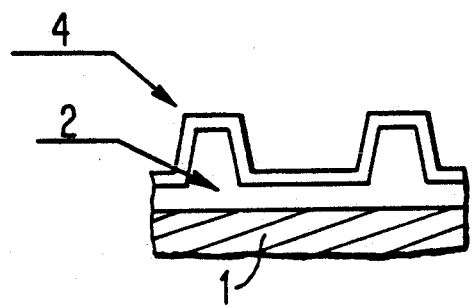

The forming die 25 has holes 26 connected to the vacuum chamber 32 as shown in FIGS. 8 and 9. The vacuum chamber 32 is kept under a vacuum by the operation of the vacuum pump 33. When the tendon passes this portion of the caterpillar, the outer surface of the plastic sheath undergoes suction by operating the vacuum pump 33 and is shaped as shown in FIG. 11 along the contacted surface of the forming die. After this, the tendon is passed into a cooling bath 28 and the plastic sheath is cooled and hardened quickly. As a result a corrugated sheath can be provided.

Figure 13:
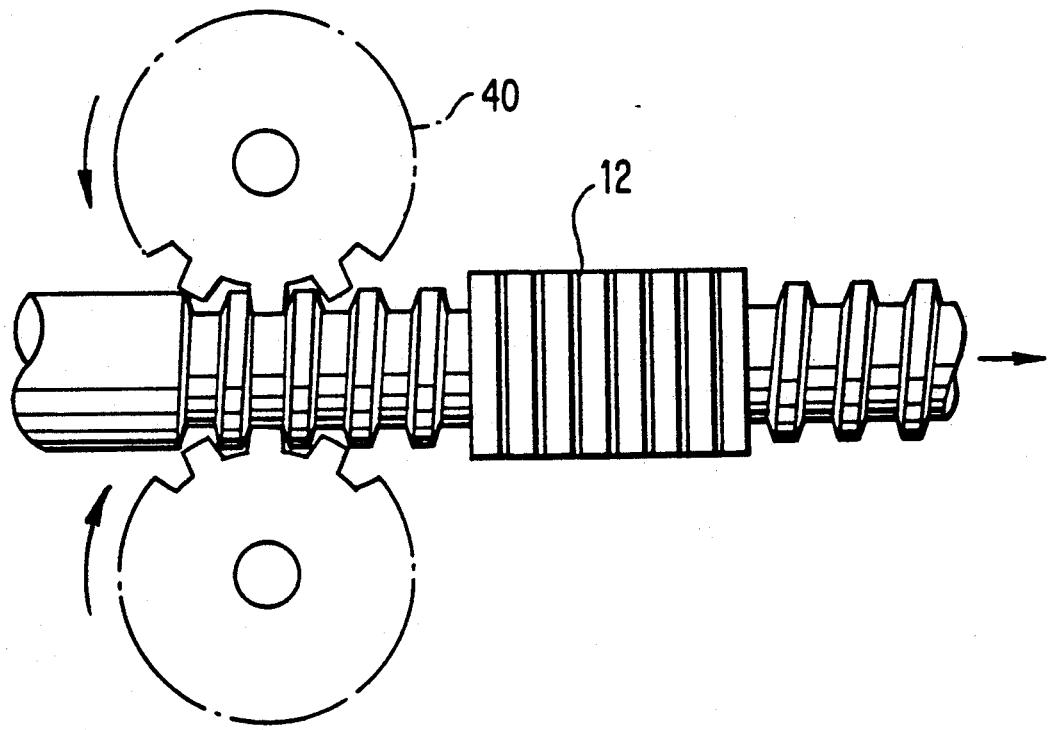
FIG. 13 shows an alternate embodiment of the conveyors used in the method of FIG. 7.

It is also possible to make the corrugated surfaces by passing the tendon between vertically indented rollers 40 and then rollers 42 set horizontally as shown in FIG. 13.

The moving speed of the tendon, the extruding speed of thermoplastic polymer and the distance from the extruding die to the caterpillar are adjusted so as to keep the temperature of the thermoplastic polymer adequate for forming and maintaining the outward shape.

Although the invention has been described in its preferred form with a certain degree of particularity, many changes and variations are possible without departing from the spirit and scope thereof. It is therefore to be understood that the invention is not limited to the specific embodiments thereof except as defined in the appended claims.

What is claimed as new and desired to be secured by Letters Patents of the United States is:

1. A method of using tendons for a prestressed concrete structure, which comprises:
   coating a wire strand core member with an unset bonding adhesive with a thickness of at least 20$\mu$ wherein said unset bonding adhesive comprises a latent normal temperature settable adhesive;
   melt extruding and shrinking a seamless plastic sheath around said coated core member;

corrugating the plastic sheath with the depth of an indented portion thereof being deeper than the thickness of the plastic forming the sheath;
rapidly cooling the tendons;
burying said plastic sheathed coated core member of each tendon in concrete;
tensioning and fixing said plastic sheathed coated core member after a strength value of said concrete has increased to a degree to permit tensioning said core member and before said unset bonding adhesive sets; and
setting said unset adhesive at a normal temperature.

* * * * *

UNITED STATES PATENT AND TRADEMARK OFFICE
CERTIFICATE OF CORRECTION

PATENT NO. : 5,254,190

DATED : October 19, 1993

INVENTOR(S) : Kurauchi et al.

It is certified that error appears in the above-identified patent and that said Letters Patent is hereby corrected as shown below:

Column 2, line 42, change "ha been" to read --has been--.

Column 5, line 24, change "A-A" to read --8c-8c--.

Column 8, line 44, change "42" to read --12--.

Signed and Sealed this

Thirty-first Day of January, 1995

*Attest:*

BRUCE LEHMAN

*Attesting Officer*      Commissioner of Patents and Trademarks